(12) United States Patent
Roll

(10) Patent No.: US 6,972,092 B1
(45) Date of Patent: Dec. 6, 2005

(54) SELF-VENTING VALVE END CAP AND METHOD

(75) Inventor: Mark A. Roll, Bessemer City, NC (US)

(73) Assignee: Wix Filtration Corp., Gastonia, NC (US)

( * ) Notice: Subject to any disclaimer, the term of this patent is extended or adjusted under 35 U.S.C. 154(b) by 255 days.

(21) Appl. No.: 10/438,867

(22) Filed: May 16, 2003

(51) Int. Cl.$^7$ .......................... B01D 35/14; B01D 35/16
(52) U.S. Cl. .................. 210/313; 210/436; 210/450; 210/454; 55/355; 123/196 A
(58) Field of Search .................. 210/436, 446, 210/447, 451, 472, 497.01, 450, 440, 443, 210/248, 454, 313; 137/588, 30; 55/355, 55/DIG. 30; 123/196 A

(56) References Cited

U.S. PATENT DOCUMENTS

| | | | |
|---|---|---|---|
| 3,382,984 A * | 5/1968 | Kuss ........................ 210/448 |
| 4,624,779 A | 11/1986 | Hurner | |
| 4,893,651 A * | 1/1990 | Herman et al. ............ 137/588 |
| 5,606,989 A * | 3/1997 | Roll et al. .................. 137/203 |
| 5,788,859 A | 8/1998 | Biere | |
| 5,833,852 A * | 11/1998 | Yoon ......................... 210/447 |
| 5,879,543 A | 3/1999 | Amini | |
| 6,171,491 B1 * | 1/2001 | Popoff et al. .............. 210/235 |

* cited by examiner

*Primary Examiner*—Joseph Drodge
(74) *Attorney, Agent, or Firm*—Berenato, White & Stavish

(57) ABSTRACT

A one-piece, molded plastic end cap (1) is designed for installation in a diesel engine fuel filter. The end cap (1) comprises a disk-shaped filter support component (2), with a top portion adhesively connected to the fuel filter center tube (8) and filter media (9), and a bottom portion which includes a downward-facing, slotted, cylindrical nipple (3). The distal end of the nipple (3) protrudes slightly from the bottom of the fuel filter housing (7), and is threaded to accept a drain plug/self-venting valve (10). The self-venting valve (10) is designed such that, the internal fuel filter vacuum is broken through a capillary-type action, and air subsequently enters the filter, and contaminants (primarily water) are able to drain freely.

10 Claims, 3 Drawing Sheets ated parts. The use of a
single molded component to perform the functions of the

SELF-VENTING VALVE END CAP AND METHOD

CROSS REFERENCE TO RELATED APPLICATIONS

None

BACKGROUND OF THE INVENTION

1. Field of the Invention

The invention generally relates to fuel filters used in reciprocating engines. Specifically, the invention relates to pre-molded one-piece end caps for diesel engine fuel filter elements.

2. Description of the Background Art

A typical diesel engine fuel filter assembly comprises a center tube surrounded by filter media. Fuel is pumped into the center tube, and flows out through the filter media, and back to the engine. The filter media includes silicon components that separate water from the fuel, and allow the water to collect at the bottom of the filter. Water is periodically drained from the bottom of the filter to ensure that the fuel is not further contaminated. Earlier filter configurations required the filter to be loosened to break the internal vacuum that exists within the filter, and subsequently allow air to enter, so that when a drain plug at the bottom of the filter was removed, contaminates would freely flow out the drain plug.

Other designs include a special type of drain plug/self-venting valve device, configured such that, when the valve was unscrewed, the internal filter vacuum was broken through a capillary-type action. Air subsequently entered the filter, and contaminants were able to drain freely, making it unnecessary to physically loosen the filter. However multiple separate components, including a spring, valve nut, and o-ring were required to create the end cap apparatus associated with this system. Specialized fabrication was also required to crimp a valve nut into the filter housing.

In order to address these difficulties, the present invention has been developed. The invention may be used in any fuel filter system, but is designed primarily as an end cap for a diesel engine fuel filter. In operation, the end cap functions to ensure that contaminated fuel can be efficiently drained from a diesel engine fuel filter, while at the same time minimizing filter production costs.

SUMMARY OF THE INVENTION

The invention comprises a one-piece, molded plastic end cap for a diesel engine fuel filter. The end cap comprises a disk-shaped filter support component, with a top portion adhesively connected to the fuel filter center tube and filter media, and a bottom portion which includes a downward-facing, slotted, cylindrical nipple. The distal end of the nipple protrudes slightly from the bottom of the fuel filter housing, and is threaded to accept a drain plug/self-venting valve. The self-venting valve is designed such that, the internal fuel filter vacuum is broken through a capillary-type action, and air subsequently enters the filter, whereby contaminants (primarily water) are able to drain freely.

The use of a one-piece pre-molded end cap lowers manufacturing costs, and improves filter reliability and wear characteristics. The filter end cap is primarily designed for use with a self-venting valve component in a diesel engine fuel filter assembly.

BRIEF DESCRIPTION OF THE DRAWING

FIG. 2 shows the end cap in the context of a more detailed view of the filter assembly, including a self-venting valve installed in the threaded portion of the end cap.

DETAILED DESCRIPTION OF THE INVENTION

An embodiment of the present invention will now be described with reference to the accompanying drawings. It should be noted that the terms "top" and "bottom" are used because, in its installed position, the fuel filter of the present invention is vertically oriented.

Figure 1:
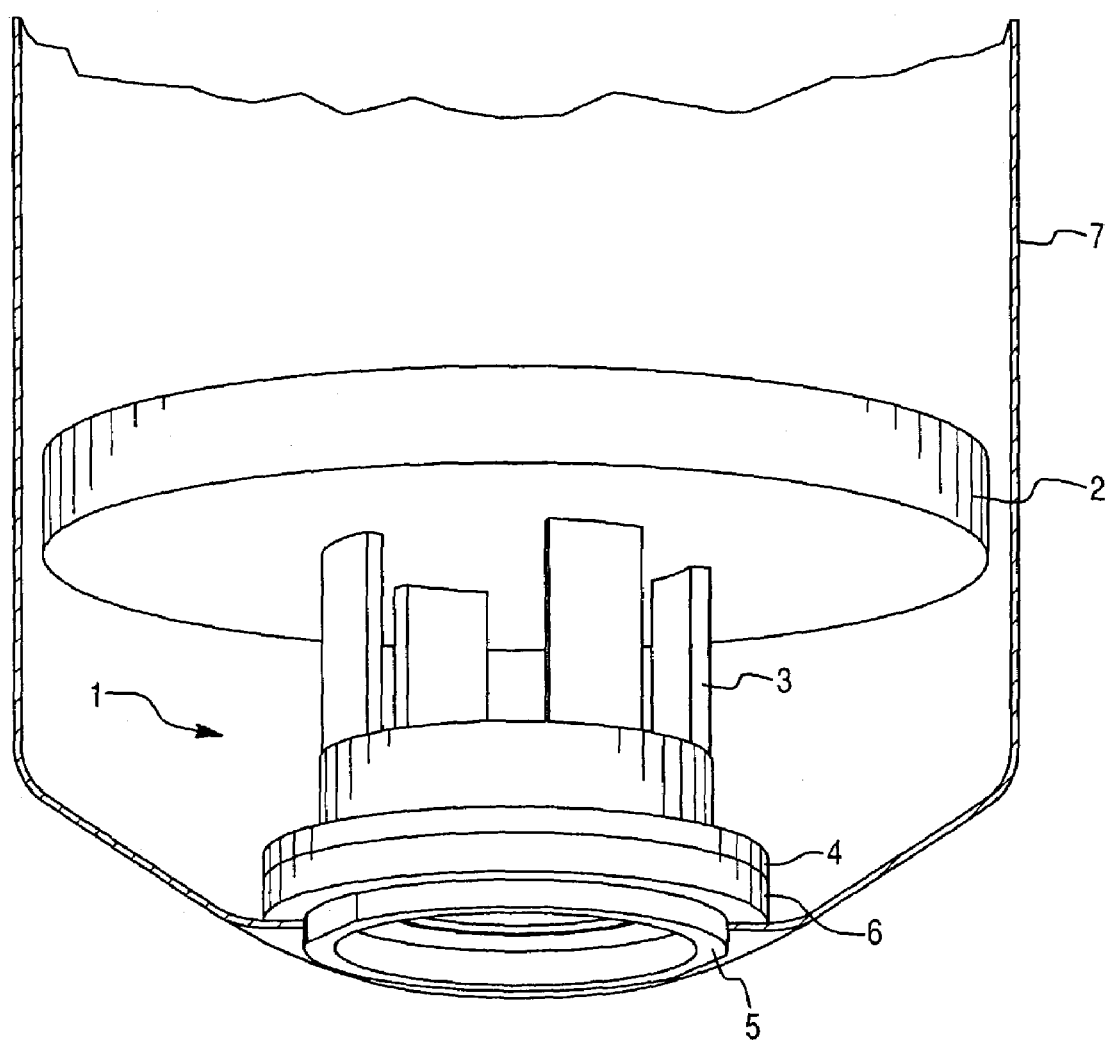
FIG. 1 is a partial sectional view of a diesel engine fuel filter, showing the end cap installed at the bottom of a fuel filter assembly.

FIG. 1 discloses a partial sectional side view of a fuel filter assembly, and an isometric view of the fuel filter end cap (1). The end cap (1) is comprised of a disk-shaped filter support component (2), a downward facing cylindrical slotted nipple (3), and a washer support collar (4). The protruding lip (5) of the slotted nipple (3) has two flat opposing surfaces to prevent the end cap (1) from turning when a component is unscrewed from the slotted nipple (3). A foam or rubber washer (6) is positioned between the washer support collar (4) and the outer housing (7) of the fuel filter assembly. The washer (6) applies a compressive spring force to the interior components of the housing (7) via the end cap (1), and creates a seal between the housing (7) and the end cap (1) at the filter's distal end.

Figure 2:
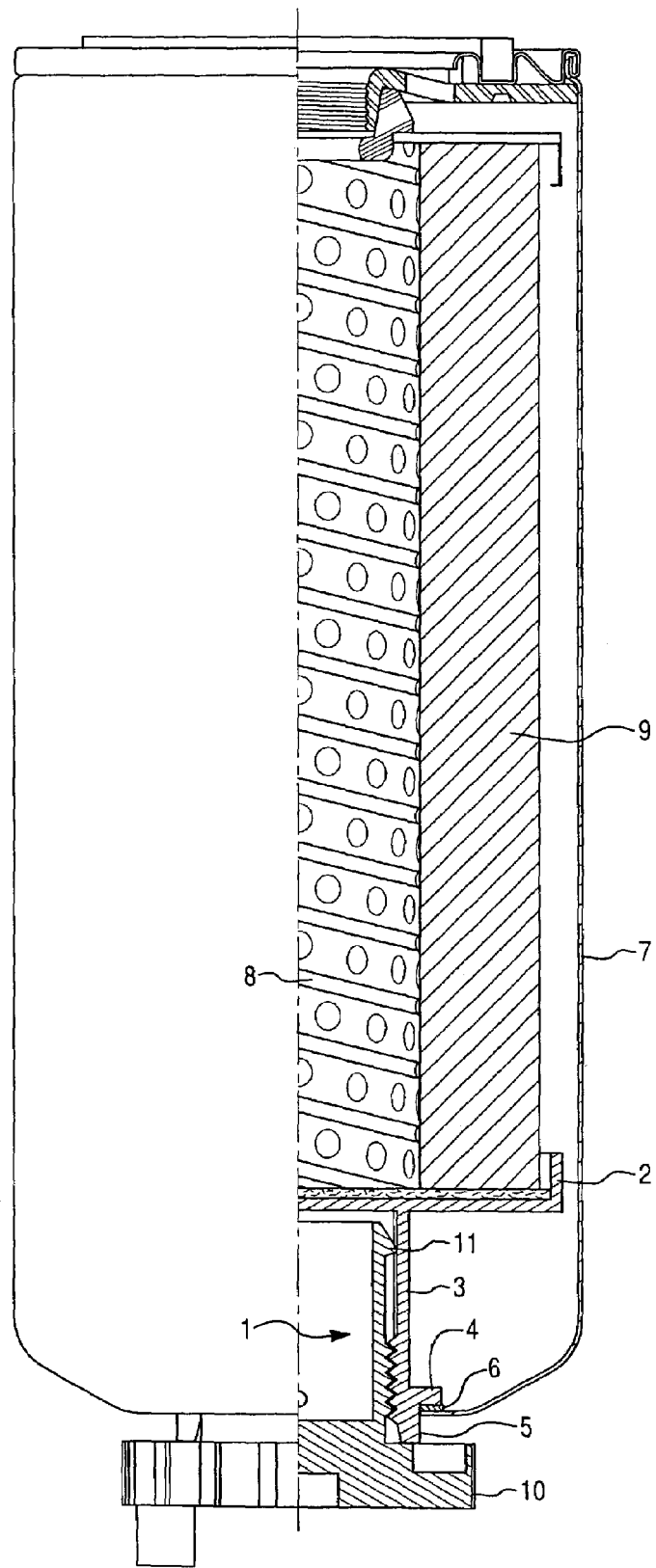
FIG. 2 is a partial sectional view of a diesel engine fuel filter, including the end cap.

FIG. 2 discloses the end cap (1) in greater detail. The end cap (1) comprises a disk shaped filter support component (2), with a top portion adhesively connected to the fuel filter center tube (8) and filter media (9), and a bottom portion which includes a downward-facing, threaded, cylindrical, slotted nipple (3). A self-venting valve (10) is screwed into the threaded portion of the slotted nipple (3).

Figure 3:
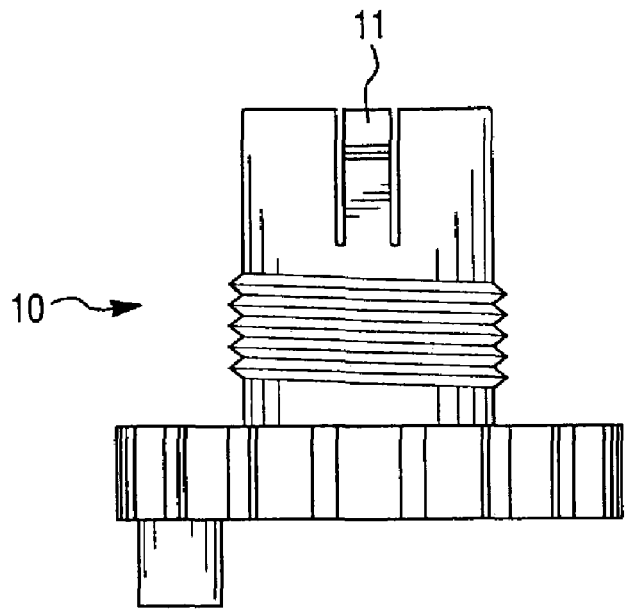
FIG. 3 shows a side view of the self-venting valve.
Figure 4:
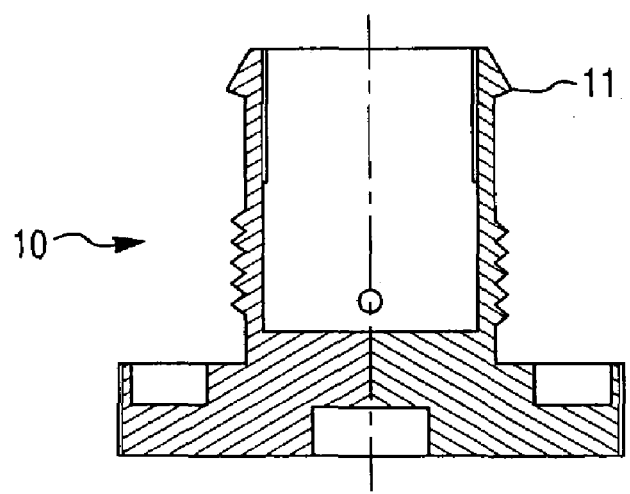
FIG. 4 shows a sectional view of the self-venting valve in FIG. 3.

FIGS. 3 and 4 show a side and sectional view of the self-venting valve (10) and its two tab (11) appendages. To drain a contaminant, such as water, from the filter, the self-venting valve (10) is unscrewed, and moves downward until the tabs (11) contact the slightly narrower threaded portion of the slotted nipple (3), effectively allowing the valve (10) to open, but preventing the valve from completely falling out of the end cap (2). Once the self-venting valve (10) is fully open, a capillary action process releases the internal fuel filter vacuum, and air is subsequently able to enter the filter, and contaminants are able to drain freely.

Although the component parts (2, 3, 4, 5) of the fuel filter end cap (1) are described separately, the end cap (1) is a single unitary component comprised of preformed plastic, fiberglass, metal, or the like. The end cap (1) is not an assembly of individually manufactured parts. The use of a single molded component to perform the functions of the end cap results in considerable savings in time and materials. It is also important to note that while the end cap is designed to accommodate a self-venting valve (i.e. when manually opened, the valve "vents" air into the filter housing), the self-venting valve does not autonomously open, and "vent" contaminated fluid, i.e. it is not a "self-draining" valve.

For the foregoing reasons, it is clear that the invention provides an improved end cap for a diesel engine fuel filter with a self-venting valve. The invention, as described, may be modified in multiple ways and applied in various technological applications. For example, in addition to diesel engine fuel filters, the end cap may have utility in other filter applications. Similarly, although the fuel filter of the present invention is vertically oriented and includes a self-venting valve, the end cap may have utility in applications that do not include vertical orientation or a self-venting valve. Additionally, end cap may be used in automotive, transport, nautical and aeronautical applications, or on any stationary or mobile power units or generators. Similarly, although the materials of construction are generally described, they may also include a variety of compositions consistent with the function of the invention. Such variations are not to be regarded as a departure from the spirit and scope of the invention, and all such modifications as would be obvious to one skilled in the art are intended to be included within the scope of the following claims.

What is claimed is:

1. A filter assembly comprising:
   a filter housing (7) defining an internal cavity,
   said filter housing (7) having an opening at said filter housing's (7) distal end,
   an end cap (1) comprising a disk-shaped filter support element (2) affixed to an end of a filter element, a threaded cylindrical nipple (3), and a support collar (4),
   said cylindrical nipple (3) having a lip (5) that protrudes through said opening,
   wherein said support element (2), said cylindrical nipple (3), said support collar (4) and said lip (5) are formed as a single unitary component, and
   said end cap is rotatably coupled with a self-venting valve.

2. The filter assembly according to claim 1, wherein an elastomeric washer (2) is mounted simultaneously adjacent said support collar (4), and said filter housing (7), said washer (6) applying a compressive spring force on said end cap (1), and forming a fluid seal at said opening.

3. The filter assembly according to claim 1, wherein a first side of said end cap (1) is adhesively connected to a center tube (8) of said filter housing and said filter media (9), and a second side of said end cap (1) protrudes from said filter housing (7), said second side being rotatably connected to said self-venting valve (10).

4. The filter assembly according to claim 1, wherein a first side of said end cap has a larger diameter than said filter media (9) to thereby completely close an end of said filter media (9).

5. The filter assembly according to claim 1, wherein said filter assembly is installed on a diesel engine.

6. A filter assembly comprising:
   a filter housing (7) defining an internal cavity,
   said filter housing (7) having an opening at said filter housing's (7) distal end,
   an end cap (1) comprising a disk-shaped filter support element (2) affixed to an end of a filter element, a threaded cylindrical nipple (3), and a support collar (4), said support element, said cylindrical nipple, and said support collar formed as a single unitary component,
   said cylindrical nipple (3) having a lip (5) that protrudes through said opening,
   a self-venting valve (10) having external threads that threadingly engage corresponding threads on said end cap (1) and
   wherein said end cap (1) is rotatably coupled with said self-venting valve (10), said self-venting valve abutting said lip (5) that protrudes through said opening.

7. The filter assembly according to claim 6, wherein said self-venting valve (10) comprises a resilient tab (11), which contacts threads of said nipple (3) when said self-venting valve (10) is in an open position to prevent separation of said self-venting valve (10) and said end cap (1).

8. The filter assembly according to claim 7, wherein said self-venting valve (10) allows air to enter said filter assembly, and contaminated fluid to leave said filter assembly, when said self-venting valve (10) is in said open position.

9. The filter assembly according to claim 6, further comprising a center tube (8) surrounded by filter media (9), said nipple (3) being in fluid communication with said center tube (8) and said filter media (9), and, said self-venting valve (10) being in fluid communication with said nipple (3).

10. The filter assembly according to claim 6, wherein said lip (5) has two flat surfaces on said lip's perimeter to prevent said end cap (1) from turning when said self-venting valve (10) is unscrewed from said nipple (3).

* * * * *